United States Patent [19]

Staffeld

[11] Patent Number: 4,587,736
[45] Date of Patent: May 13, 1986

[54] CREASER TOOL

[76] Inventor: Stanley E. Staffeld, 1621 Woodsboro, Royal Oak, Mich. 48067

[21] Appl. No.: 717,628

[22] Filed: Mar. 29, 1985

Related U.S. Application Data

[63] Continuation-in-part of Ser. No. 309,912, Oct. 8, 1981, Pat. No. 4,507,817.

[51] Int. Cl.⁴ .......................... B26B 25/00; B26D 3/08
[52] U.S. Cl. ........................................ 30/292; 30/365; 493/241
[58] Field of Search ................. 30/292, 306, 319, 358, 30/365; 493/241; 83/886

[56] References Cited

U.S. PATENT DOCUMENTS

| | | | |
|---|---|---|---|
| 424,676 | 4/1890 | Jensik | 30/365 |
| 874,583 | 12/1907 | Garret | 30/365 |
| 1,508,709 | 9/1924 | Nasmith | 83/886 |
| 1,935,522 | 11/1933 | Prior | 83/886 |
| 1,963,425 | 6/1934 | Stine | 30/292 |
| 4,217,693 | 8/1980 | Roder | 30/292 |

FOREIGN PATENT DOCUMENTS 7536 of 1885 United Kingdom ................. 30/365

Primary Examiner—Jimmy C. Peters
Attorney, Agent, or Firm—Krass and Young

[57] ABSTRACT

A creasing tool for relatively soft material such as corrugated board including a generally cylindrical roller mounted for rotation upon an axle which is journaled on a retaining yoke. The roller includes an annular ridge projecting from its surface about substantially the entire circumference thereof and generally perpendicular to the axis of rotation of the roller. An elongate handle is connected to one end of the yoke opposite the end upon which the roller is journaled so that the operator may guide the roller over the surface of the material, thereby allowing the projecting ridge to produce a crease or weakened line on the surface of the material for easy bending or cutting along the line.

5 Claims, 5 Drawing Figures

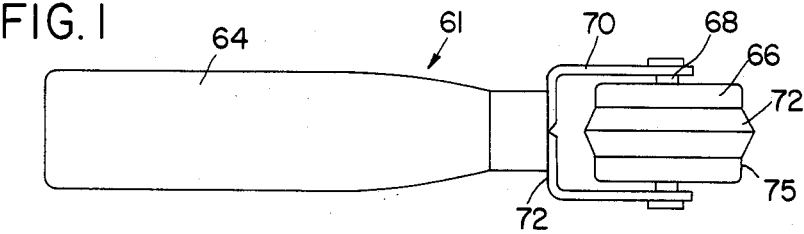
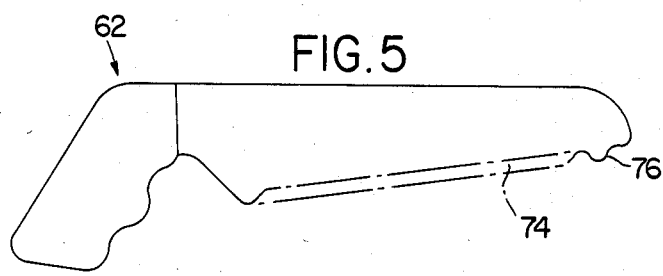
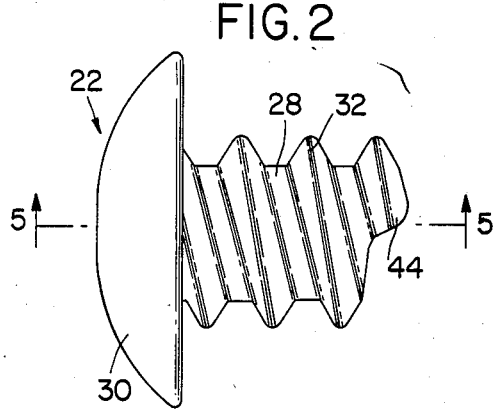
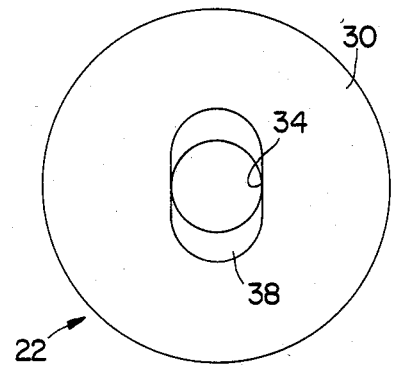
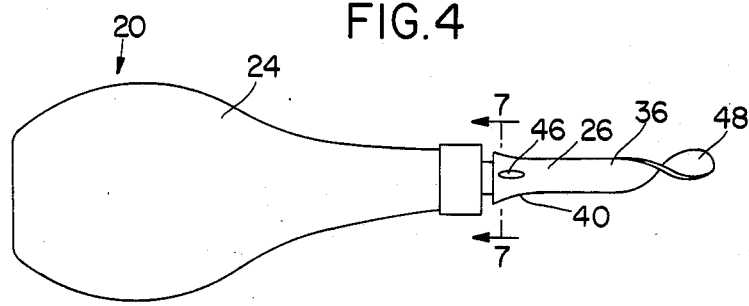

CREASER TOOL

RELATED APPLICATIONS

This is a continuation-in-part of U.S. Ser. No. 309,912, entitled Connector and Insertion Tool, filed Oct. 8, 1981 now U.S. Pat. No. 4,507,817 issued Apr. 2, 1985.

FIELD OF THE INVENTION

The present invention relates generally to tools utilized in shaping, forming and constructing objects from relatively soft materials such as corrugated board (cardboard), and more particularly to a creaser tool for creating weakened lines on the surface of the cardboard.

BACKGROUND OF THE INVENTION

In addition to being a popular choice of raw materials for playtime construction by children, cardboard is widely used as a construction material for items such as temporary displays and/or article carriers because it is lightweight, relatively inexpensive, and easy to cut and form. In the construction of an item from one or more sheets of cardboard, it is often desirable that a weakened line be formed on the surface of the cardboard sheet, defining a separation point or folding point in the material. There are a variety of known marking and scribing devices which are utilized for these purposes in connection with relatively harder construction material such as wood, steel, glass or plastic. However these devices are generally designed with a sharp cutting edge in order to provide a well defined and/or weakened line on the surface of the material. When used in connection with corrugated board these devices often cut completely through one or more layers of the board, a result which is especially undesirable when the user merely intends to define a weakened line about which the cardboard sheet is to be folded. In addition, conventional scribing tools are often too sharp or dangerous for use by children.

It is an object of the present invention to provide a cardboard creasing tool which may be applied to the surface of a cardboard sheet with moderate pressure to define a crease about which the cardboard may be folded or cut.

It is a further object of the present invention to provide a cardboard creasing tool which is child-safe.

SUMMARY OF THE INVENTION

According to the present invention, a child-safe cardboard creasing tool is provided including a generally cylindrical roller having an annular ridge projecting from the surface of the roller about substantially the entire circumference thereof. The roller is mounted upon an axle which, in turn, is journaled within a yoke to allow for easy rotation of the roller. An elongate handle is affixed to the yoke, preferably along an axis which is transverse to the axis of rotation of the roller. When the roller is rolled over the surface of a cardboard sheet with moderate pressure applied by the operator, a crease is formed by the projecting ridge in the cardboard without cutting any of the cardboard plies. The cardboard may then be folded easily along that crease regardless of the shape and direction of the crease.

The creasing tool of the present invention may be used in connection with other tools, such as a child-safe insertion tool, connectors, and cutting tool to form complex and intricate structures, such as enclosures, furniture, or display racks.

Other objects, features and advantages of the invention will become apparent when the following description is viewed in association with the accompanying drawings.

BRIEF DESCRIPTION OF THE DRAWINGS

FIG. 1 is a side view of the creasing tool of the present invention;

FIG. 2 is a side view of a child-safe connector used with the present invention to construct articles from cardboard;

FIG. 3 is an end view of the connector of FIG. 2 from the head end;

FIG. 4 depicts an embodiment of a child-safe insertion tool used with the present invention to connect two or more plies of cardboard; and FIG. 5 is a saw-type tool for use with the present invention.

DESCRIPTION OF THE PREFERRED EMBODIMENT

Referring to FIG. 1, a child-safe cardboard creasing tool 61 is provided having a handle 64 and a generally cylindrical roller 66. The roller is mounted on an axle 68 which in turn is mounted upon a supporting yoke 70. The handle is affixed to one end 72 of the yoke 70.

The roller 66 has a ridge 72 projecting from the outer surface 74 of the roller. In the preferred embodiment, this annular ridge 72 is raised 90 mils from the surface 74 of the roller 66 and has an included angle of at least 90° and preferably approximately 135°. It should be noted that, while the included angle of the ridge is non-sharp and child-safe, the ridge 72 projects from the main surface 75 of the roller enough that, when the roller 66 is rolled over the surface of a cardboard sheet with moderate pressure applied by the operator, a crease is formed in the cardboard without penetrating the surface.

The roller 66, axle 68, yoke 70, and handle 64 are preferably fabricated from lightweight plastic, although wood, metal or other suitable commercially available materials may be substituted without departing from the spirit of the invention.

As will be appreciated by those skilled in the art, the creasing tool of the present invention allows the user to define crease lines of various configurations and easily fold cardboard sheets along those crease lines in a safe and efficient manner.

A non-sharp cutting knife 62, of the type shown in FIG. 5, may be utilized for cutting cardboard sheets in fabricating the desired structures. The cutting edge 74 of the knife is non-sharp in compliance with the United States government Consumer Products Safety Commission sharp-point and sharp-edge tests as described in 16 CFR 1501.48 (Jan. 1, 1980) and 16 CFR 1501.49 (Jan. 1, 1980) respectively. These tests are based upon research conducted by the National Bureau of Standards and assure safe use by children or any other persons. Connectors 22 and an insertion tool 20, as shown in FIGS. 2-4, each having non-sharp edges and points, may be utilized to connect two or more plies of cardboard together in fabricating various structures as desired. These tools are described in greater detail in Applicant's pending U.S. application Ser. No. 309,912 entitled "Connector and Insertion Tool", the subject matter of which is hereby incorporated herein.

Thus, the creasing tool and other tools disclosed herein can be utilized to crease, fold, cut and connect numerous pieces of cardboard to form various structures. In particular, children can have hours of creative enjoyment constructing various enclosures, furniture, boxes and like from scrap cardboard that is found around the house.

It should be noted that the tools of the present invention may be utilized in connection with other relatively soft materials without departing from the spirit of the invention.

I claim:

1. A creasing tool for relatively soft material such as corrugated board including a generally cylindrical roller having a central, shallow ridge projecting from the surface of the roller about substantially the entire circumference thereof, said roller defining cylindrical land surfaces on either side of said ridge, said ridge being defined by opposite ramp surfaces extending respectively upwardly from said land surfaces and meeting generally in a central plane generally perpendicular to the axis of rotation of the roller, said ramps surfaces forming an included angle of at least 90°, said ridge having a height in said plane substantially less than the width of said ridge and said ramp surfaces transitioning at said plane into one another to form a smooth circumferential apex, whereby as the roller traverses the surface of a sheet of corruagted board with moderate pressure applied by the operator, said ridge forms a weakened crease thereon and said land surfaces rollably engage the adjacent surfaces of corrugated board to Preclude penetration of the surface of the board by said ridge.

2. The creasing tool of claim 1 including:
   an axle for supporting the roller for rotation thereon; and
   handle means connected to the axle thereby allowing the operator to grasp the handle means and position the creasing tool along the surface of the corrugated board without interferring with the rotation of the roller.

3. The creasing tool of claim 1 wherein the ridge is raised 90 mils above the surface of the roller.

4. The roller of claim 1 wherein the ridge has an included angle substantially greater than 90°.

5. A creasing tool for relatively soft material such as corrugated board including:
   a generally cylindrical roller having a shallow, central ridge projecting from the surface of the roller about substantially the entire circumference thereof, said roller defining cylindrical land surfaces on either side of said central ridge, said ridge being defined by opposite ramp surfaces extending respectively upwardly from said land surfaces and meeting generally in a central plane generally perpendicular to the axis of rotation of the roller, said ramp surfaces forming an included angle of at least 90°, said ridge having a height in said plane substantially less than the width of said ridge, and said ramp surfaces smoothly transitioning at said plane to form a smooth circumferential apex;
   an axle for supporting the roller for rotation thereon;
   a supporting yoke having a first end and a second end, the second end adapted to retain the axle and roller thereon; and
   an elongate handle connected to the first end of the yoke,
   whereby, as the roller traverses the surface of a sheet of corrugated board with moderate pressure applied by the operator, said ridge forms a weakened crease thereon and said land surfaces rollably engage the adjacent surfaces of the corrugated board to preclude penetration of the surface of the board by said ridge.

* * * * *